United States Patent
Chen et al.

(10) Patent No.: US 12,276,352 B2
(45) Date of Patent: *Apr. 15, 2025

(54) HYDRAULIC TRIGGER WITH LOCKED SPRING FORCE

(71) Applicant: Schlumberger Technology Corporation, Sugar Land, TX (US)

(72) Inventors: Bo Chen, Houston, TX (US); Brian Walther, Missouri City, TX (US); Rannie Dong, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/455,996

(22) Filed: Aug. 25, 2023

(65) Prior Publication Data

US 2023/0400118 A1 Dec. 14, 2023

Related U.S. Application Data

(63) Continuation of application No. 17/995,939, filed as application No. PCT/US2021/027951 on Apr. 19, 2021, now Pat. No. 11,774,002.

(Continued)

(51) Int. Cl.
*F16K 31/163* (2006.01)
*E21B 34/06* (2006.01)
(Continued)

(52) U.S. Cl.
CPC .......... *F16K 31/163* (2013.01); *F16K 11/044* (2013.01); *F16K 31/363* (2013.01); *E21B 34/06* (2013.01); *E21B 34/08* (2013.01)

(58) Field of Classification Search
CPC ................................. E21B 34/06; E21B 34/08
See application file for complete search history.

(56) References Cited

U.S. PATENT DOCUMENTS

| | | |
|---|---|---|
| 3,964,544 A | 6/1976 | Farley et al. |
| 3,976,136 A | 8/1976 | Farley et al. |

(Continued)

FOREIGN PATENT DOCUMENTS

| | | |
|---|---|---|
| CN | 108643854 A | 10/2018 |
| GB | 2346401 A | 8/2000 |

(Continued)

OTHER PUBLICATIONS

International Search Report and Written Opinion issued in PCT Application PCT/US2021/018278, dated Jun. 3, 2021 (9 pages).

(Continued)

*Primary Examiner* — Robert K Arundale
(74) *Attorney, Agent, or Firm* — Jeffrey D. Frantz

(57) ABSTRACT

A system includes a compression spring having a latch sleeve, a piston rod including a groove section, and a ratchet assembly that progressively moves the piston rod in a downward direction. A latch collet on the latch sleeve sits on the groove section of the piston rod in a first position of the system. The latch collet locks a spring force of the compression spring as the ratchet assembly progressively moves the piston rod in the downward direction. The latch collet becomes unsupported from the groove section when the piston rod has progressively moved a predetermined distance, causing the compression spring to release and provide a push force that actuates a hydraulic valve from the first position to a second position.

18 Claims, 2 Drawing Sheets

Related U.S. Application Data

(60) Provisional application No. 63/011,478, filed on Apr. 17, 2020.

(51) Int. Cl.
*E21B 34/08* (2006.01)
*F16K 11/044* (2006.01)
*F16K 31/363* (2006.01)

(56) References Cited

U.S. PATENT DOCUMENTS

| | | |
|---|---|---|
| 4,109,725 A | 8/1978 | Williamson et al. |
| 4,444,268 A | 4/1984 | Barrington |
| 4,667,743 A | 5/1987 | Ringgenberg et al. |
| 5,029,646 A | 7/1991 | Blizzard, Jr. |
| 5,180,007 A | 1/1993 | Manke |
| 5,188,183 A | 2/1993 | Hopmann et al. |
| 5,518,073 A | 5/1996 | Manke et al. |
| 5,765,641 A | 6/1998 | Shy |
| 5,810,087 A | 9/1998 | Patel |
| 5,924,696 A | 7/1999 | Frazier |
| 6,041,864 A | 3/2000 | Patel et al. |
| 6,085,845 A | 7/2000 | Patel et al. |
| 6,227,298 B1 | 5/2001 | Patel |
| 6,230,807 B1 | 5/2001 | Patel |
| 6,230,808 B1 | 5/2001 | French et al. |
| 6,244,351 B1 | 6/2001 | Patel et al. |
| 6,250,383 B1 | 6/2001 | Patel |
| 6,253,857 B1 | 7/2001 | Gano |
| 6,289,999 B1 | 9/2001 | Dewey |
| 6,302,208 B1 | 10/2001 | Walker et al. |
| 6,302,216 B1 | 10/2001 | Patel |
| 6,354,378 B1 | 3/2002 | Patel |
| 6,397,949 B1 | 6/2002 | Walker |
| 6,439,306 B1 | 8/2002 | Patel |
| 6,494,269 B2 | 12/2002 | French et al. |
| 6,505,684 B2 | 1/2003 | Rayssiguier et al. |
| 6,523,613 B2 | 2/2003 | Rayssiguier et al. |
| 6,595,296 B1 | 7/2003 | French |
| 6,631,768 B2 | 10/2003 | Patel et al. |
| 6,634,429 B2 | 10/2003 | Henderson et al. |
| 6,662,877 B2 | 12/2003 | Patel |
| 6,691,785 B2 | 2/2004 | Patel |
| 6,722,440 B2 | 4/2004 | Turner |
| 6,945,331 B2 | 9/2005 | Patel |
| 7,198,109 B2 | 4/2007 | Turner |
| 7,252,152 B2 | 8/2007 | LoGiudice et al. |
| 7,303,020 B2 | 12/2007 | Bishop et al. |
| 7,337,850 B2 | 3/2008 | Contant |
| 7,347,272 B2 | 3/2008 | Patel et al. |
| 7,503,398 B2 | 3/2009 | LoGiudice et al. |
| 7,510,001 B2 | 3/2009 | Spring et al. |
| 7,617,875 B2 | 11/2009 | Darnell et al. |
| 7,980,316 B2 | 7/2011 | Swenson et al. |
| 8,056,643 B2 | 11/2011 | Basmajian et al. |
| 8,113,286 B2 | 2/2012 | Beall et al. |
| 8,256,518 B2 | 9/2012 | Guven et al. |
| 8,261,817 B2 | 9/2012 | Hayter et al. |
| 8,286,717 B2 | 10/2012 | Giroux et al. |
| 8,365,832 B2 | 2/2013 | Martin et al. |
| 8,403,042 B2 | 3/2013 | Green et al. |
| 8,469,106 B2 | 6/2013 | Caminari et al. |
| 8,528,641 B2 | 9/2013 | Clem et al. |
| 8,567,515 B2 | 10/2013 | Giroux et al. |
| 8,602,105 B2 | 12/2013 | Sinclair |
| 8,684,099 B2 | 4/2014 | Azimi et al. |
| 8,776,890 B2 | 7/2014 | Basmajian et al. |
| 8,783,343 B2 | 7/2014 | Giroux et al. |
| 8,863,853 B1 | 10/2014 | Harris et al. |
| 8,870,153 B2 | 10/2014 | Ross |
| 8,893,798 B2 | 11/2014 | Hayter et al. |
| 8,978,750 B2 | 3/2015 | Noske et al. |
| 9,068,417 B2 | 6/2015 | Swenson et al. |
| 9,133,692 B2 | 9/2015 | Edwards |
| 9,163,481 B2 | 10/2015 | Noske et al. |
| 9,175,552 B2 | 11/2015 | Kitzman |
| 9,222,335 B2 | 12/2015 | Caminari et al. |
| 9,309,745 B2 | 4/2016 | Patel |
| 9,353,600 B2 | 5/2016 | Cong et al. |
| 9,410,401 B2 | 8/2016 | Cox et al. |
| 9,453,380 B2 | 9/2016 | Hardin, Jr. et al. |
| 9,458,698 B2 | 10/2016 | Harris et al. |
| 9,482,076 B2 | 11/2016 | Patel |
| 9,518,439 B2 | 12/2016 | Hallundbæk et al. |
| 9,518,445 B2 | 12/2016 | Noske |
| 9,624,753 B2 | 4/2017 | Stinessen et al. |
| 9,810,343 B2 | 11/2017 | Miller et al. |
| 9,869,153 B2 | 1/2018 | Moreno et al. |
| 10,036,231 B2 | 7/2018 | Murdoch |
| 10,132,137 B2 | 11/2018 | McDowell et al. |
| 10,138,710 B2 | 11/2018 | Noske |
| 10,151,171 B2 | 12/2018 | Noske et al. |
| 10,208,568 B2 | 2/2019 | Hill et al. |
| 10,214,999 B2 | 2/2019 | Noske et al. |
| 10,233,725 B2 | 3/2019 | Provost |
| 10,273,767 B2 | 4/2019 | Noske |
| 10,352,131 B2 | 7/2019 | Dockweiler |
| 10,422,202 B2 | 9/2019 | Kellner et al. |
| 10,472,929 B2 | 11/2019 | Miller et al. |
| 10,502,024 B2 | 12/2019 | Wang et al. |
| 10,533,399 B2 | 1/2020 | Ceccon De Azevedo et al. |
| 10,550,667 B2 | 2/2020 | Rushing et al. |
| 10,605,047 B2 | 3/2020 | Patel |
| 10,697,270 B2 | 6/2020 | Lundheim et al. |
| 10,704,363 B2 | 7/2020 | Johnson et al. |
| 10,738,570 B2 | 8/2020 | Miller et al. |
| 10,781,665 B2 | 9/2020 | Murdoch |
| 10,890,048 B2 | 1/2021 | Noske et al. |
| 10,895,130 B2 | 1/2021 | Noske et al. |
| 10,947,798 B2 | 3/2021 | Noske |
| 10,954,749 B2 | 3/2021 | Noske |
| 11,111,759 B2 | 9/2021 | Mudigere et al. |
| 11,293,265 B2 | 4/2022 | Burris et al. |
| 11,346,183 B2 | 5/2022 | Mair et al. |
| 2008/0001111 A1 | 1/2008 | Ross |
| 2009/0008102 A1 | 1/2009 | Anderson |
| 2009/0229828 A1 | 9/2009 | Ross |
| 2009/0294124 A1 | 12/2009 | Patel |
| 2011/0032798 A1 | 2/2011 | Ray et al. |
| 2011/0056679 A1 | 3/2011 | Rytlewski |
| 2011/0168403 A1 | 7/2011 | Patel |
| 2012/0018170 A1 | 1/2012 | Basmajian et al. |
| 2012/0042966 A1 | 2/2012 | Ross |
| 2012/0285702 A1 | 11/2012 | Rytlewski |
| 2015/0233208 A1 | 8/2015 | Muscroft |
| 2017/0022783 A1 | 1/2017 | Yong |
| 2018/0163508 A1 | 6/2018 | Kellner |
| 2019/0128099 A1 | 5/2019 | Woudwijk |
| 2020/0115992 A1 | 4/2020 | Wang et al. |
| 2020/0141211 A1 | 5/2020 | Franklin et al. |
| 2020/0270966 A1 | 8/2020 | Moyes et al. |
| 2020/0291749 A1 | 9/2020 | Johnson et al. |
| 2021/0040816 A1 | 2/2021 | Hiorth et al. |
| 2021/0381326 A1 | 12/2021 | Inglis et al. |
| 2022/0170343 A1 | 6/2022 | Brodie et al. |

FOREIGN PATENT DOCUMENTS

| | | |
|---|---|---|
| GB | 2541943 A | 3/2017 |
| JP | 2001299951 A | 10/2001 |
| WO | 2009098498 A1 | 8/2009 |
| WO | 2014149049 A1 | 9/2014 |
| WO | 2016207863 A1 | 12/2016 |
| WO | 2017027243 A1 | 2/2017 |
| WO | 2020068466 A1 | 4/2020 |
| WO | 2020219435 A1 | 10/2020 |
| WO | 2020231415 A1 | 11/2020 |
| WO | 2021167917 A1 | 8/2021 |

(56) References Cited

FOREIGN PATENT DOCUMENTS

| WO | 2021212103 A1 | 10/2021 |
| WO | 2022204284 A1 | 9/2022 |

OTHER PUBLICATIONS

Combined Search and Examination Report issued in GB2102204.1, dated Aug. 18, 2021 (6 pages).
International Search Report and Written Opinion issued in PCT Application PCT/US2021/027951, dated Aug. 3, 2021 (10 pages).

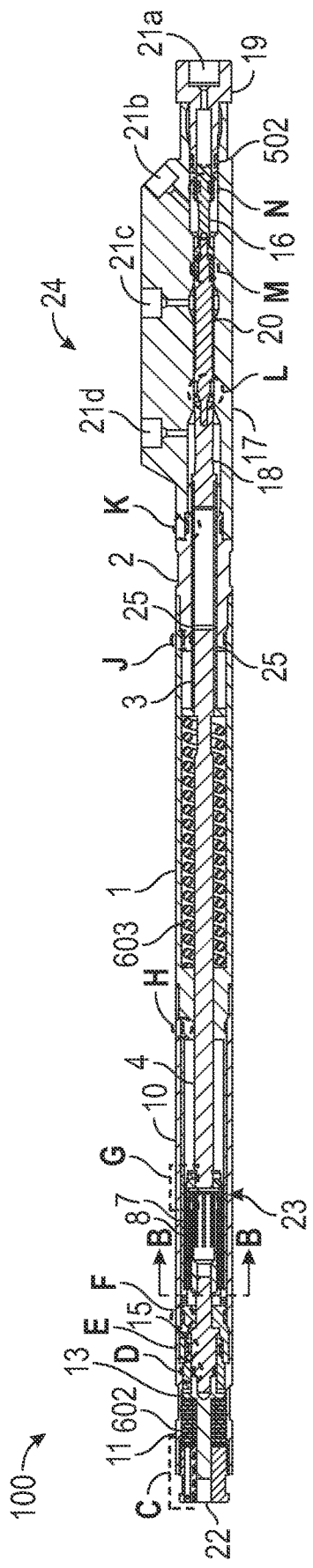
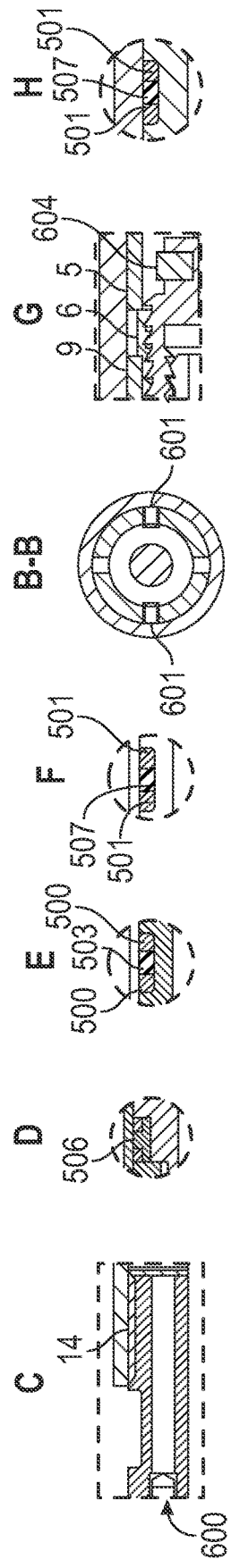
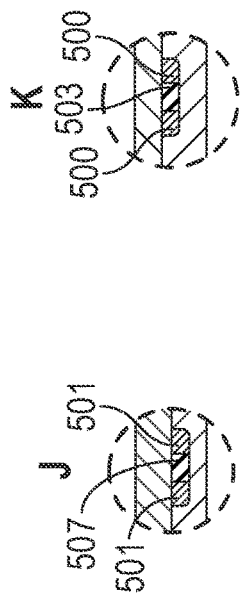
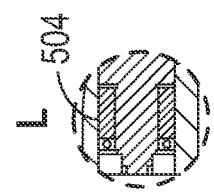
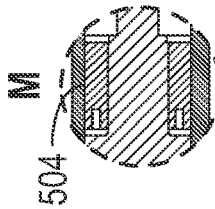
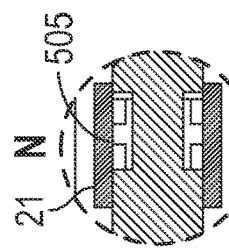
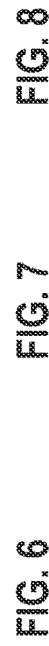
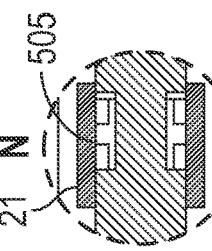
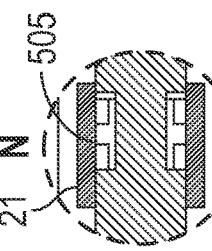

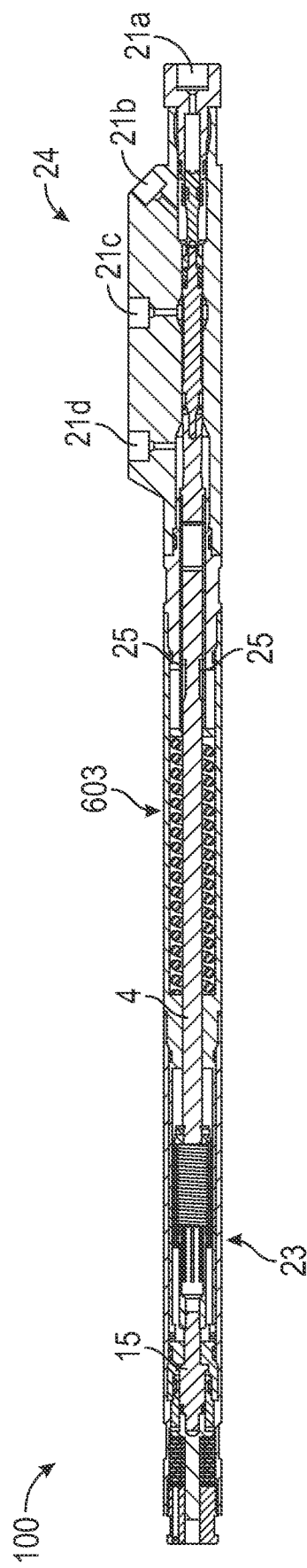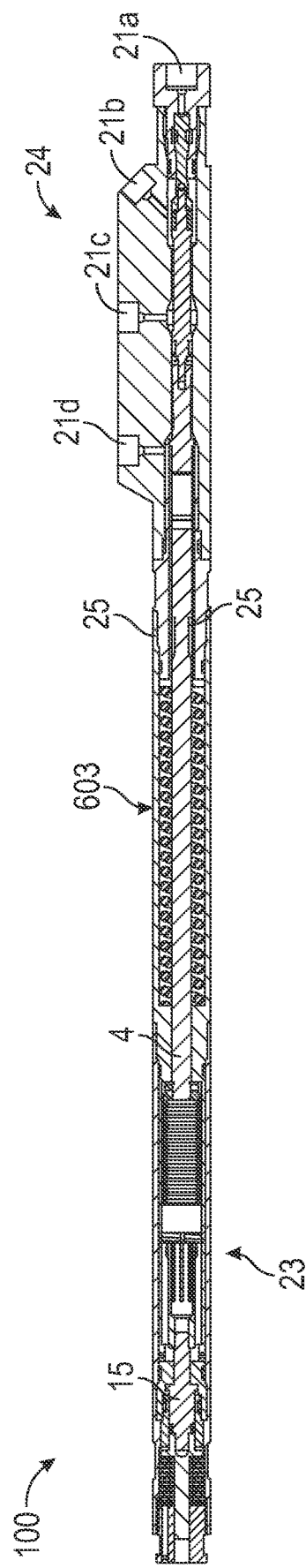
FIG. 14A
FIG. 14B

HYDRAULIC TRIGGER WITH LOCKED SPRING FORCE

CROSS-REFERENCE TO RELATED APPLICATION

The present document is a Continuation application of U.S. application Ser. No. 17/995,939, filed Oct. 11, 2022, which is a National Stage Entry of International Application No.: PCT/US2021/027951, filed on Apr. 19, 2021, which is based on and claims priority to U.S. Provisional Patent Application Ser. No. 63/011,478, filed Apr. 17, 2020, which is incorporated herein by reference in its entirety.

BACKGROUND

An isolation valve is a device that provides isolation to a reservoir. A traditional application of an isolation valve is to protect the reservoir from damaging fluid during transition from completion to production. An isolation valve may include at least a trigger section and an actuator to remotely change the state of the isolation valve.

SUMMARY

A system according to one or more embodiments of the present disclosure includes a compression spring having a latch sleeve, a piston rod comprising a groove section, and a ratchet assembly that progressively moves the piston rod in a downward direction. In one or more embodiments of the present disclosure, a latch collet on the latch sleeve sits on the groove section of the piston rod in a first position of the system. In one or more embodiments of the present disclosure, the latch collet locks a spring force of the compression spring as the ratchet assembly progressively moves the piston rod in the downward direction. In one or more embodiments of the present disclosure, the latch collet becomes unsupported from the groove section when the piston rod has progressively moved a predetermined distance, causing the compression spring to release and provide a push force that actuates a hydraulic valve from the first position of the system to a second position.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and:

FIG. 1 shows a hydraulic trigger system for actuating a hydraulic valve according to one or more embodiments of the present disclosure;

FIG. 2 shows further detail of portion C shown in FIG. 1 according to one or more embodiments of the present disclosure;

FIG. 3 shows further detail of portion D shown in FIG. 1 according to one or more embodiments of the present disclosure;

FIG. 4 shows further detail of portion E shown in FIG. 1 according to one or more embodiments of the present disclosure;

FIG. 5 shows further detail of portion F shown in FIG. 1 according to one or more embodiments of the present disclosure;

FIG. 6 shows the hydraulic trigger system of FIG. 1 along line B-B according to one or more embodiments of the present disclosure;

FIG. 7 shows further detail of portion G shown in FIG. 1 according to one or more embodiments of the present disclosure;

FIG. 8 shows further detail of portion H shown in FIG. 1 according to one or more embodiments of the present disclosure;

FIG. 9 shows further detail of portion J shown in FIG. 1 according to one or more embodiments of the present disclosure;

FIG. 10 shows further detail of portion K shown in FIG. 1 according to one or more embodiments of the present disclosure;

FIG. 11 shows further detail of portion L shown in FIG. 1 according to one or more embodiments of the present disclosure;

FIG. 12 shows further detail of portion M shown in FIG. 1 according to one or more embodiments of the present disclosure;

FIG. 13 shows further detail of portion N shown in FIG. 1 according to one or more embodiments of the present disclosure;

FIG. 14A shows a hydraulic trigger system for actuating a hydraulic valve according to one or more embodiments of the present disclosure in a position; and FIG. 14B shows a hydraulic trigger system for actuating a hydraulic valve according to one or more embodiments of the present disclosure in a different position.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

In the specification and appended claims: the terms "up" and "down," "upper" and "lower," "upwardly" and "downwardly," "upstream" and "downstream," "uphole" and "downhole," "above" and "below," "top" and "bottom," and other like terms indicating relative positions above or below a given point or element are used in this description to more clearly describe some embodiments of the disclosure.

The present disclosure generally relates to a system and method for actuating a hydraulic valve. More specifically, the present disclosure relates to a hydraulic trigger and an associated method for actuating an isolation valve. In the system and method according to one or more embodiments of the present disclosure, ratchet teeth of the hydraulic trigger may be used as a counting system to ensure that the isolation valve changes states only when a demanded count is reached.

One or more embodiments of the present disclosure is related to U.S. Provisional Patent Application No. 62/978,085, entitled HYDRAULIC TRIGGER FOR ISOLATION VALVES, filed Feb. 18, 2020, which is incorporated herein by reference in its entirety. In this hydraulic trigger, a ratchet mechanism progressively compresses a power spring until a predetermined spring force is reached, which shears the shear screws and pushes a power spring stopper connected to the power spring in a downward direction to actuate a hydraulic valve from a first position to a second position.

In the hydraulic trigger system according to one or more embodiments of the present disclosure, a spring is compressed as a ratchet assembly progressively moves a piston rod in a downward direction. A latch collet on a latch sleeve of the compression spring sits on a groove section of the piston rod. The latch collet locks the spring force of the compression spring. Once the piston rod is moved sufficiently downward by operation of the ratchet assembly, the latch collet becomes unsupported, causing the compression spring to release and provide the push force necessary to actuate a hydraulic valve from a first position to a second position.

Referring now to FIG. 1, a hydraulic trigger system 100 according to one or more embodiments of the present disclosure is shown. As shown in FIG. 1, the hydraulic trigger system 100 according to one or more embodiments of the present disclosure may include the following components: a cycle piston 15, a ratchet assembly 23, a piston rod 4, a compression spring 603, a spring latch sleeve 3, a latch collet 25, and a hydraulic valve 24. As further shown in FIG. 1, the hydraulic trigger system 100 according to one or more embodiments of the present disclosure may also include bellows 22 uphole of the hydraulic trigger system 100. In one or more embodiments of the present disclosure, the bellows 22 provide pressure compensation, isolate a spring chamber of a cycling spring 602 associated with the cycle piston 15 from external (annulus) fluid, and prevent entry of fluid with debris into the hydraulic trigger system 100. The hydraulic trigger system 100 according to one or more embodiments of the present disclosure may also include an upper body housing 11, a middle body housing and a lower body housing 1, as shown in FIG. 1, for example.

Still referring to FIG. 1, the hydraulic trigger system 100 according to one or more embodiments of the present disclosure may also include a piston extension (drive piston) 13, and a ratchet collet pusher 8 and a ratchet sleeve 7 of the ratchet assembly 23. In operation, when internal pressure increases within the hydraulic trigger system 100, the ratchet collet pusher 8 moves uphole, the latch collet 25 retracts and jumps associated threaded teeth, and the outer diameter threads on the ratchet collet pusher 8 and the inner diameter threads on the ratchet sleeve 7 engage with each other. Then, when internal pressure decreases within the hydraulic trigger system 100, the ratchet collet pusher 8 moves down, pushing the ratchet sleeve 7 in a downhole direction. As the internal pressure repeatedly increases and decreases within the hydraulic trigger system 100, the ratchet sleeve 7 progressively moves in the downhole direction, which moves the piston rod 4 in the downhole direction. In one or more embodiments of the present disclosure, the piston rod 4 includes a groove section (i.e., a recess on an outer diameter of the piston rod 4), and the latch collet 25 on the spring latch sleeve 3 of the compression spring 603 sits on this groove section. Due to this configuration, the latch collet 25 is able to lock the spring force of the compression spring 603. In one or more embodiments of the present disclosure, the compression spring 603 may be installed into the hydraulic trigger system 100 in an already compressed state, for example. Once the piston rod 4 is moved sufficiently downward by operation of the ratchet collet pusher 8 and the ratchet sleeve 7 of the ratchet assembly 23, the latch collet 25 becomes unlocked and unsupported, causing the compression spring 603 to release the compression spring load and provide the push force necessary to actuate the hydraulic valve 24, as further described below. In one or more embodiments of the present disclosure, the piston rod 4 has moved sufficiently downward when the groove section of the piston rod 4 reaches a collet finger end of the latch collet 25 on the spring latch sleeve 3. At this point, the collet fingers will be deflected, causing the latch collet 25 to become unsupported, as previously described. In one or more embodiments of the present disclosure, the push force necessary to actuate the hydraulic valve 24, as previously described, is created by the released compression spring 603 moving the unlocked and unsupported latch collet 25 and the piston rod 4 in the downward direction.

Still referring to FIG. 1, the hydraulic trigger system 100 according to one or more embodiments of the present disclosure may also include a valve connector 2 for attaching the associated hydraulic valve 24. In one or more embodiments of the present disclosure, the hydraulic valve 24 of the hydraulic trigger system 100 includes an upper pilot piston 18, a valve block for a three-way, two position valve 17, a middle pilot piston 20, a lower pilot piston 16, and an O-ring assembly 502, for example. As shown in FIG. 1, the upper pilot piston 18, the middle pilot piston 20, and the lower pilot piston 16 may be cooperative with each other and function as an integral hydraulic piston of the hydraulic valve 24, according to one or more embodiments of the present disclosure.

In view of FIG. 1, the three-way, two position valve 17 includes four chambers through a wall of the valve block. With respect to the three-way, two position valve 17, one way is connected to an upper chamber 21a of the hydraulic piston, one way is connected to a lower chamber 21b of the hydraulic piston, and one way is connected to an atmospheric chamber 21c, according to one or more embodiments of the present disclosure. The fourth chamber through the wall of the valve block of the three-way, two position valve 17 is a pressure chamber 21d, which provides pressure for cycles of the hydraulic trigger system 100, according to one or more embodiments of the present disclosure. Further, with respect to the two positions of the three-way, two position valve 17, in the first position of the hydraulic piston of the valve 17, the upper chamber 21a and the lower chamber 21b communicate through the valve block of the three-way, two position valve 17. Increased pressure in the pressure chamber 21d creates pressure cycles, which cause the ratchet assembly 23 to progressively move the piston rod 4 in the downward direction until the latch collet 25 becomes unlocked and unsupported, causing the compression spring 603 to release the compression spring load, and provide the push force necessary to actuate the hydraulic piston (i.e., the pilot pistons 18, 20, 16) of the valve 17 from the first position to the second position. More specifically, the push force is created by the released compression spring 603 moving the unlocked and unsupported latch collet 25 and the piston rod 4 in the downward direction, which pushes the hydraulic piston in the valve block of the three-way, two position valve 17 from the first position to the second position. In the second position of the hydraulic piston of the valve 17, the lower chamber 21b communicates with the atmospheric chamber 21c, and the lower chamber 21b is isolated from the upper chamber 21a. With the lower chamber 21b in fluid communication with the atmospheric chamber 21c, hydrostatic pressure initially in the lower chamber 21b may empty into the atmospheric chamber 21c creating a differential pressure that opens an associated isolation valve (not shown). Stated another way, moving the hydraulic piston of the valve 17 from the first position to the second position will open the associated isolation valve, according to one or more embodiments of the present disclosure. As further shown in FIG. 1, the hydraulic trigger system 100 according to one or more embodiments of the present disclosure may also include a crossover (autoclave) 19, which transmits the differential pressure and facilitates remote opening of the isolation valve.

Referring now to FIG. 2, further detail of portion C shown in FIG. 1 is provided according to one or more embodiments of the present disclosure. As shown, FIG. 2 shows that portion C includes, inter alia, a screw 600 or other type of fastener and a nut ring 14, according to one or more embodiments of the present disclosure.

Referring now to FIG. 3, further detail of portion D shown in FIG. 1 is provided according to one or more embodiments of the present disclosure. As shown, FIG. 3 shows that portion D includes, inter alia, a T-seal assembly 506, an O-ring seal, or any other type of seal, according to one or more embodiments of the present disclosure. In one or more embodiments of the present disclosure, the T-seal assembly 506 includes a dynamic seal that isolates internal pressure within the hydraulic trigger system 100 from external pressure. The resulting differential pressure applies a force to the dynamic seal and the drive piston 13, which is installed with the seal. Cycling of the differential pressure moves the drive piston 13 and provides energy for the ratchet assembly 23.

Referring now to FIG. 4, further detail of portion E shown in FIG. 1 is provided according to one or more embodiments of the present disclosure. As shown, FIG. 4 shows that portion E includes, inter alia, at least one back-up ring 500 and an O-ring 503 or other type of seal, according to one or more embodiments of the present disclosure. The at least one back-up ring 500 and the O-ring 503 provide a static body seal that isolates external and internal pressure/fluid, according to one or more embodiments of the present disclosure.

Referring now to FIG. 5, further detail of portion F shown in FIG. 1 is provided according to one or more embodiments of the present disclosure. As shown, FIG. 5 shows that portion F includes, inter alia, at least one back-up ring 501 and an O-ring 507 or other type of seal, according to one or more embodiments of the present disclosure. That at least one back-up ring 501 and the O-ring 503 provide a body static seal that isolates external and internal pressure/fluid, according to one or more embodiments of the present disclosure.

Referring now to FIG. 6, the hydraulic trigger system 100 of FIG. 1 along line B-B is shown according to one or more embodiments of the present disclosure. As shown, FIG. 6 shows that the cross-section along line B-B includes, inter alia, at least one screw 601 or other type of fastener, according to one or more embodiments of the present disclosure.

Referring now to FIG. 7, further detail of portion G shown in FIG. 1 is provided according to one or more embodiments of the present disclosure. As shown, FIG. 7 shows that portion G includes, inter alia, an upper extension sleeve 9, a ratchet snap ring 6 of the ratchet assembly 23, a lower extension sleeve 5, and a magnet 604, according to one or more embodiments of the present disclosure. In one or more embodiments of the present disclosure, the upper extension sleeve 9 prevents rotation of the ratchet snap ring 6. The at least one screw 601 of FIG. 6 rotationally locks the upper extension sleeve 9, according to one or more embodiments of the present disclosure. In one or more embodiments of the present disclosure, the upper extension sleeve 9 and the lower extension sleeve 5 are axially positioned with respect to the ratchet snap ring 6. Alternatively, the at least one screw 601 may be omitted from the design if the upper extension sleeve 9 and the middle body housing 10 are combined into an integral component. In other embodiments of the present disclosure, the upper extension sleeve 9, the at least one screw 601, the ratchet snap ring 6, and the lower extension sleeve 5 may be omitted from the design without compromising the functionality of the hydraulic trigger system 100. In one or more embodiments of the present disclosure, the magnet 604 may be used for checking the position of the ratchet sleeve 7 inside the middle body housing 10.

Referring now to FIG. 8, further detail of portion H shown in FIG. 1 is provided according to one or more embodiments of the present disclosure. As shown, FIG. 8 shows that portion H includes at least one back-up ring 501, and an O-ring 507 or other type of seal, according to one or more embodiments of the present disclosure. The at least one back-up ring 501 and the O-ring 507 provide a static body seal that isolates external and internal pressure/fluid, according to one or more embodiments of the present disclosure.

Referring now to FIG. 9, further detail of portion J shown in FIG. 1 is provided according to one or more embodiments of the present disclosure. As shown, FIG. 9 shows that portion J includes at least one back-up ring 501, and an O-ring 507 or other type of seal, according to one or more embodiments of the present disclosure. The at least one back-up ring 501 and the O-ring 507 provide a static body seal that isolates external and internal pressure/fluid, according to one or more embodiments of the present disclosure.

Referring now to FIG. 10, further detail of portion K shown in FIG. 1 is provided according to one or more embodiments of the present disclosure. As shown, FIG. 10 shows that portion K includes, inter alia, at least one back-up ring 500, and an O-ring 503 or other type of seal, according to one or more embodiments of the present disclosure. The at least one back-up ring 500 and the O-ring 503 provide a static body seal that isolates external and internal pressure/fluid, according to one or more embodiments of the present disclosure.

Referring now to FIG. 11, further detail of portion L shown in FIG. 1 is provided according to one or more embodiments of the present disclosure. As shown, FIG. 11 shows that portion L includes, inter alia, at least one seal assembly 504, according to one or more embodiments of the present disclosure.

Referring now to FIG. 12, further detail of portion M shown in FIG. 1 is provided according to one or more embodiments of the present disclosure. As shown, FIG. 12 shows that portion M includes, inter alia, at least one seal assembly 504, according to one or more embodiments of the present disclosure.

Referring now to FIG. 13, further detail of portion N shown in FIG. 1 is provided according to one or more embodiments of the present disclosure. As shown, FIG. 13 shows that portion N includes, inter alia, a sleeve (T-seal) 21 and a T-seal assembly 505, according to one or more embodiments of the present disclosure. In one or more embodiments of the present disclosure, T-seal assembly 505 stabs into a seal bore on the crossover (autoclave) 19 during actuation, as the hydraulic piston of the three-way, two position valve 17 transitions from the first position to the second position, as previously described. Further, the T-seal assembly 505 isolates the upper chamber 21a and the lower chamber 21b of the hydraulic piston of the valve 17, as previously described. In one or more embodiments of the present disclosure, the sleeve 21 has the same inner diameter as the seal bore on the crossover (autoclave) 19. Due to the sleeve 21, the T-seal assembly 505 easily stabs into the seal bore on the crossover (autoclave) 19 without damaging the T-seal assembly 505. Indeed, if the sleeve 21 is omitted from the design, the T-seal assembly 505 may be cut by a sharp edge during the stabbing operation.

Referring now to FIG. 14A, a hydraulic trigger system 100 for actuating a hydraulic valve 24 is shown in an actuation position, according to one or more embodiments of the present disclosure. Specifically, FIG. 14A shows the hydraulic trigger system 100 at a position in which the pressure cycles have completed, and before actuation or before the three-way, two position valve 17 of the hydraulic valve 24 transitions from the first position to the second position.

Referring now to FIG. 14B, a hydraulic trigger system 100 for actuating a hydraulic valve 24 is shown in a different actuation position, according to one or more embodiments of the present disclosure. Specifically, FIG. 14B shows the hydraulic trigger system 100 at a position in which the valve block of the three-way, two position valve 17 has changed from the first position to the second position.

In view of FIGS. 1, 14A, and 14B, at the last cycle, after the piston rod 4 reaches the position in which the latch collet 25 becomes unlocked and unsupported, causing the compression spring 603 to release the compression spring load, due to high amounts of friction on the at least one seal assembly 504 (FIGS. 11 and 12), there may be a scenario where the release of the compression spring load by the compression spring 603 is insufficient to move the hydraulic piston (i.e., pilot pistons 18, 20, 16) in the valve block to change the position of the three-way, two position valve 17 from the first position to the second position. In this scenario, the ratchet assembly 23 may continue cycling until a right end of the drive piston 13 shoulders on a left side of the pilot piston 18, causing an additional force from the cycle spring 602 to be transmitted to the pilot piston 18 to move the hydraulic piston in the valve block to change the position of the three-way, two position valve 17 from the first position to the second position.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system, comprising:
   a compression spring having a compressed state and an expanded state;
   a piston rod coupled to the compression spring, wherein the piston rod is movable from a first position to a second position; and
   a ratchet assembly, wherein the ratchet assembly is engaged with the piston rod and is configured to move the piston rod from the first position to the second position, wherein:
      the compression spring is locked in the compressed state when the piston rod is in the first position;
      the compression spring is released and is allowed to expand to the expanded state when the piston rod is in the second position; and
      when the compression spring expands to the expanded state, the compression spring moves the piston rod to a third position to actuate a hydraulic valve.

2. The system of claim 1, wherein the ratchet assembly comprises: a ratchet collet pusher; and a ratchet sleeve.

3. The system of claim 1, wherein;
   the hydraulic valve comprises:
      a valve block for a three-way, two position valve; and
      a valve piston;
   the valve piston is positionable in a first valve position and a second valve position;
   when the piston rod is in the third position, the valve piston is in the second valve position; and
   when the valve piston is in the second valve position, the hydraulic valve is actuated.

4. The system of claim 3, wherein the three-way, two position valve comprises a plurality of chambers through a wall of the valve block.

5. The system of claim 4, wherein the plurality of chambers comprises: an upper chamber; a lower chamber; an atmospheric chamber; and a pressure chamber.

6. The system of claim 5, wherein, when the valve piston is in the first valve position, the upper chamber is in fluid communication with the lower chamber through the valve block of the three-way, two position valve.

7. The system of claim 6, wherein, when the valve piston is in the second valve position, the lower chamber is in fluid communication with the atmospheric chamber, and the lower chamber is isolated from the upper chamber.

8. The system of claim 5, wherein, when the valve piston is in the second valve position, the lower chamber is in fluid communication with the atmospheric chamber, and the lower chamber is isolated from the upper chamber.

9. The system of claim 3, further comprising: an isolation valve, wherein positioning the valve piston in the second valve position opens the isolation valve.

10. A method for actuating a hydraulic valve, comprising:
    moving a piston rod from a first position to a second position with a ratchet assembly engaged with the piston rod, wherein:
       a compression spring coupled to the piston rod is locked in a compressed state when the piston rod is in the first position; and
       the compression spring is released and allowed to expand to an expanded state when the piston rod is in the second position; and
    expanding the compression spring to move the piston rod to a third position.

11. The method of claim 10, wherein moving the piston rod to the third position moves a valve piston of the hydraulic valve from a first valve position to a second valve position, and wherein in the second valve position, the hydraulic valve is actuated.

12. The method of claim 11, wherein moving the valve piston from the first valve position to the second valve position opens an isolation valve.

13. The method of claim 11, wherein the hydraulic valve comprises: a valve block for a three-way, two position valve.

14. The method of claim 13, wherein the three-way, two position valve comprises a plurality of chambers through a wall of the valve block.

15. The method of claim 14, wherein the plurality of chambers comprises: an upper chamber; a lower chamber; an atmospheric chamber; and a pressure chamber.

16. The method of claim 15, wherein, when the valve piston is in the first valve position, the upper chamber is in fluid communication with the lower chamber through the valve block of the three-way, two position valve.

17. The method of claim 16, wherein, when the valve piston is in the second valve position, the lower chamber is in fluid communication with the atmospheric chamber, and the lower chamber is isolated from the upper chamber.

18. The method of claim 15, wherein, when the valve piston is in the second valve position, the lower chamber is in fluid communication with the atmospheric chamber, and the lower chamber is isolated from the upper chamber.

* * * * *